Sept. 16, 1952 J. A. PAASCHE 2,610,578
AUTOMATIC MULTICOLOR AIR PAINTING APPARATUS
Filed Sept. 18, 1947 5 Sheets-Sheet 1
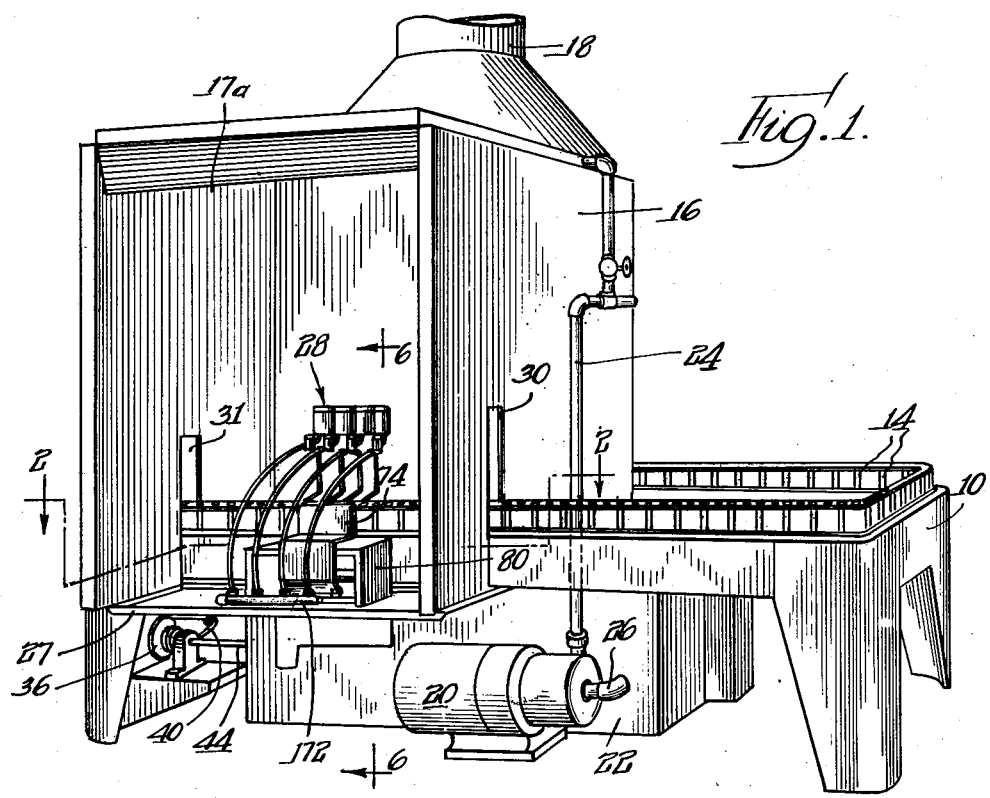
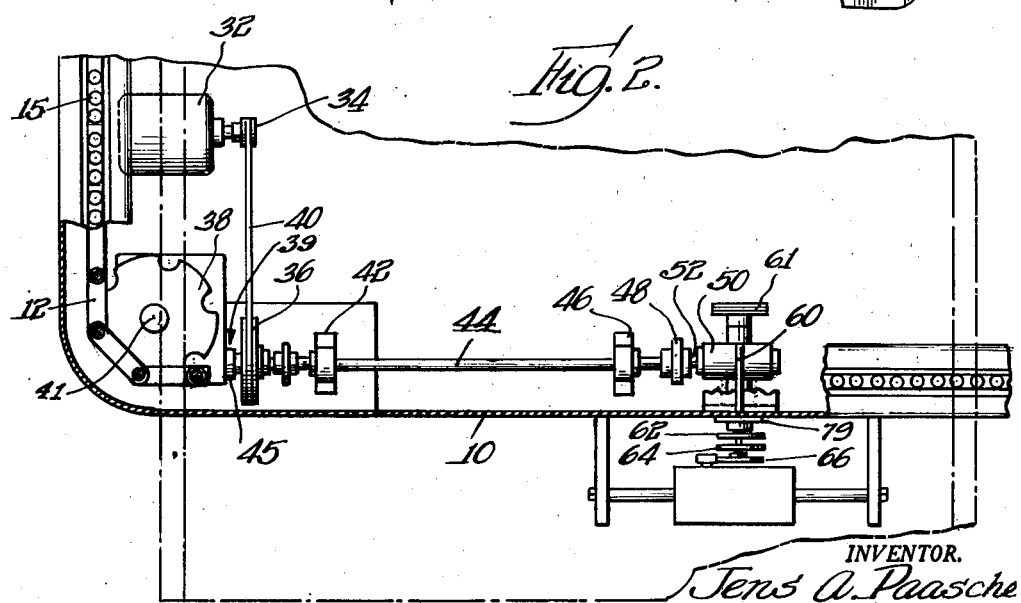
INVENTOR.
Jens A. Paasche
BY
Moore, Olson & Trexler
Attys.

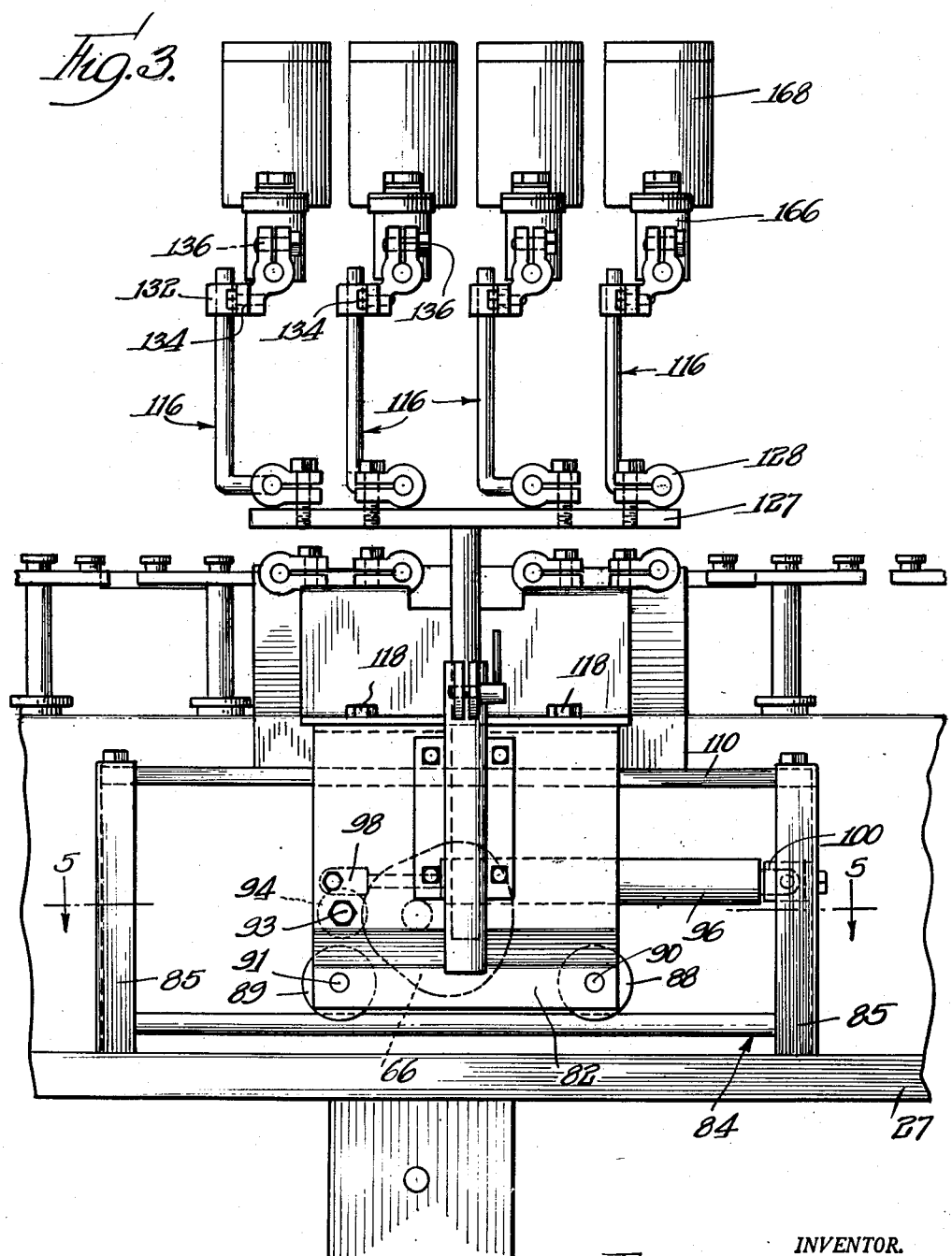

Sept. 16, 1952 J. A. PAASCHE 2,610,578
AUTOMATIC MULTICOLOR AIR PAINTING APPARATUS
Filed Sept. 18, 1947 5 Sheets-Sheet 3
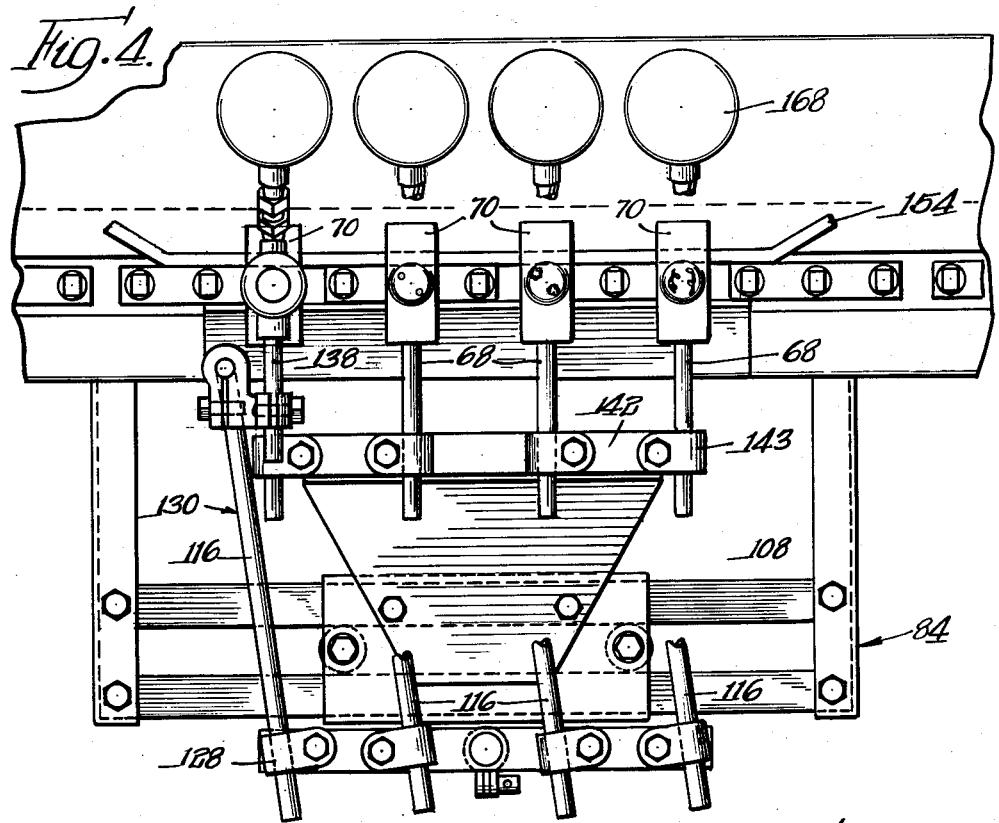
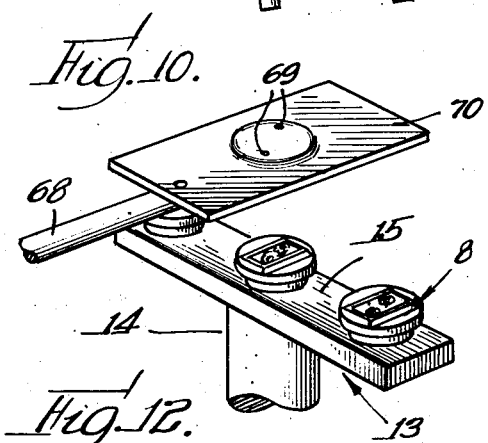
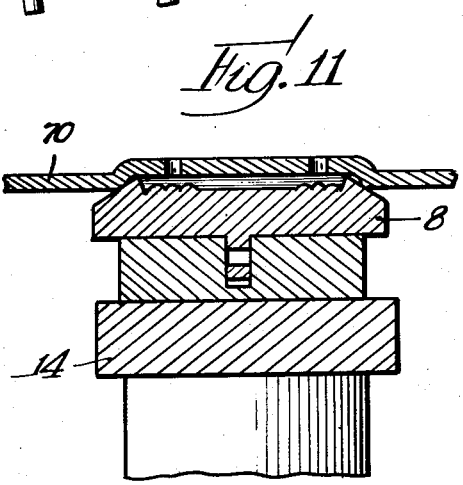
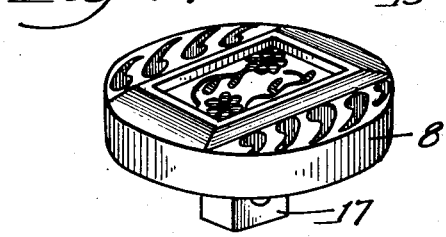
INVENTOR.
Jens A. Paasche
BY
Moore, Olson & Trexler
attys.

Sept. 16, 1952 J. A. PAASCHE 2,610,578
AUTOMATIC MULTICOLOR AIR PAINTING APPARATUS
Filed Sept. 18, 1947 5 Sheets-Sheet 4
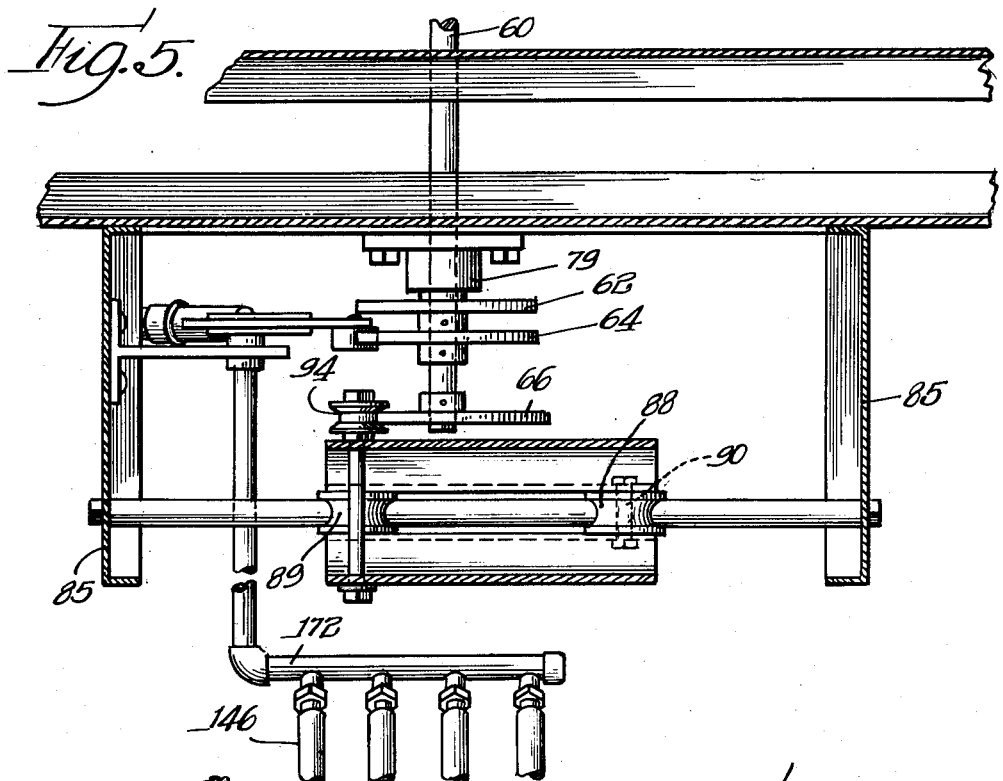
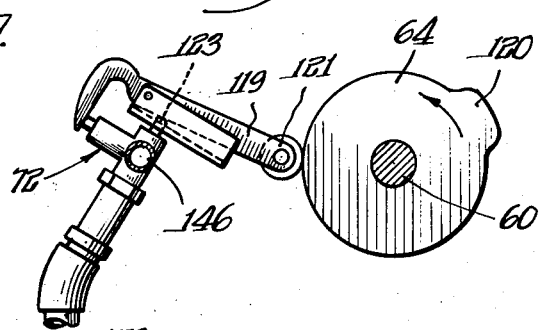
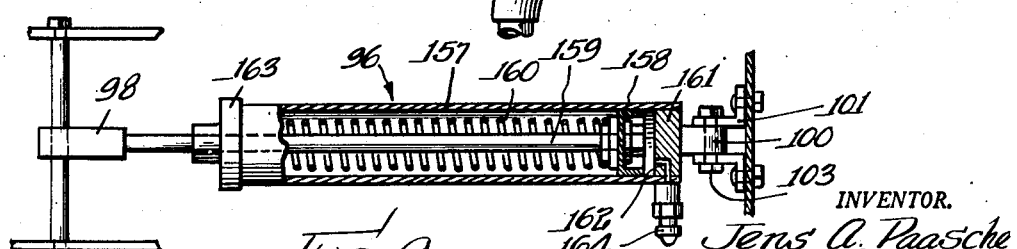
INVENTOR.
Jens A. Paasche
BY
Moore, Olson & Trexler
attys.

Patented Sept. 16, 1952

2,610,578

UNITED STATES PATENT OFFICE 2,610,578

AUTOMATIC MULTICOLOR AIRPAINTING APPARATUS

Jens A. Paasche, Chicago, Ill.

Application September 18, 1947, Serial No. 774,773

11 Claims. (Cl. 101—115)

The present invention relates to an automatic airpainting or spray apparatus and more particularly to an airpainting apparatus adapted for painting a plurality of objects with a plurality of colors continuously.

In manufacturing processes it is frequently necessary to paint an object in a plurality of colors in order to prepare the object for sale. In the past, this operation has been accomplished by painting the objects by hand, thereby increasing the cost of manufacture. Therefore, it is desirable to provide an automatic multi-color painting apparatus which is relatively simple and which is easily adapted for the automatic painting of various objects.

In accordance with the present invention, an automatic multi-color airpainting or airfinishing apparatus is provided which utilizes a plurality of spray guns or airbrushes which are controlled so as to be operative periodically to paint objects brought in the proximity of the guns by a continuously moving mechanism. Such a mechanism may comprise a support on which a conveyor chain is mounted, the conveyor chain being adapted to carry and position a plurality of article supports into the range of the spray guns or airbrushes. Automatic means are provided for exposing the various areas of the object to be airpainted and controlling the duration of the spraying process by the airbrushes in synchronism with the movement of the conveyor chain. Means are also provided for cleaning the paint-laden exhaust air before exhausting the same back into the room.

It therefore is an object of the present invention to provide a multi-color airpainting apparatus which is relatively simple and economical to manufacture.

Another object of the present invention is to provide an automatic airpainting apparatus having a plurality of spray guns or airbrushes arranged to move in synchronism with articles to be painted.

It is still another object of the present invention to provide an automatic airpainting apparatus having means which automatically expose only a selected area of the object to be sprayed, this apparatus moving in synchronism with the article to be coated and the spraying apparatus and permitting any contoured area to be coated.

These and other objects of the present invention will become apparent after a study of the following description taken in connection with the accompanying drawings, wherein:

Figure 1 is a perspective view of an automatic multi-color airpainting apparatus embodying the present invention;

Figure 2 is a sectional view taken along the line 2—2 of Figure 1 with a portion of the conveyor chain broken away;

Figure 3 is a front view of the airpainting apparatus and control mechanism of same, as shown in Figure 1, with the housings broken away;

Figure 4 is a top view of the spraying apparatus shown in Figure 3;

Figure 5 is a sectional view of the control mechanism of the airpainting apparatus taken along the line 5—5 of Figure 3;

Figure 7 shows the cam wheel and rider in detailed section, which positions the stencil plate for the spraying operation;

Figure 8 shows the control mechanism for determining the spraying time;

Figure 9 is an enlarged view, partially in cross section, of the cushioning cylinder;

Figure 10 is an enlarged view of a support and stencil plate;

Figure 11 is a cross sectional view of the stencil plate and support taken along the line 11—11 in Figure 6; and Figure 12 is a perspective view of an object adapted to be sprayed by the apparatus of the present invention.

Figure 6:
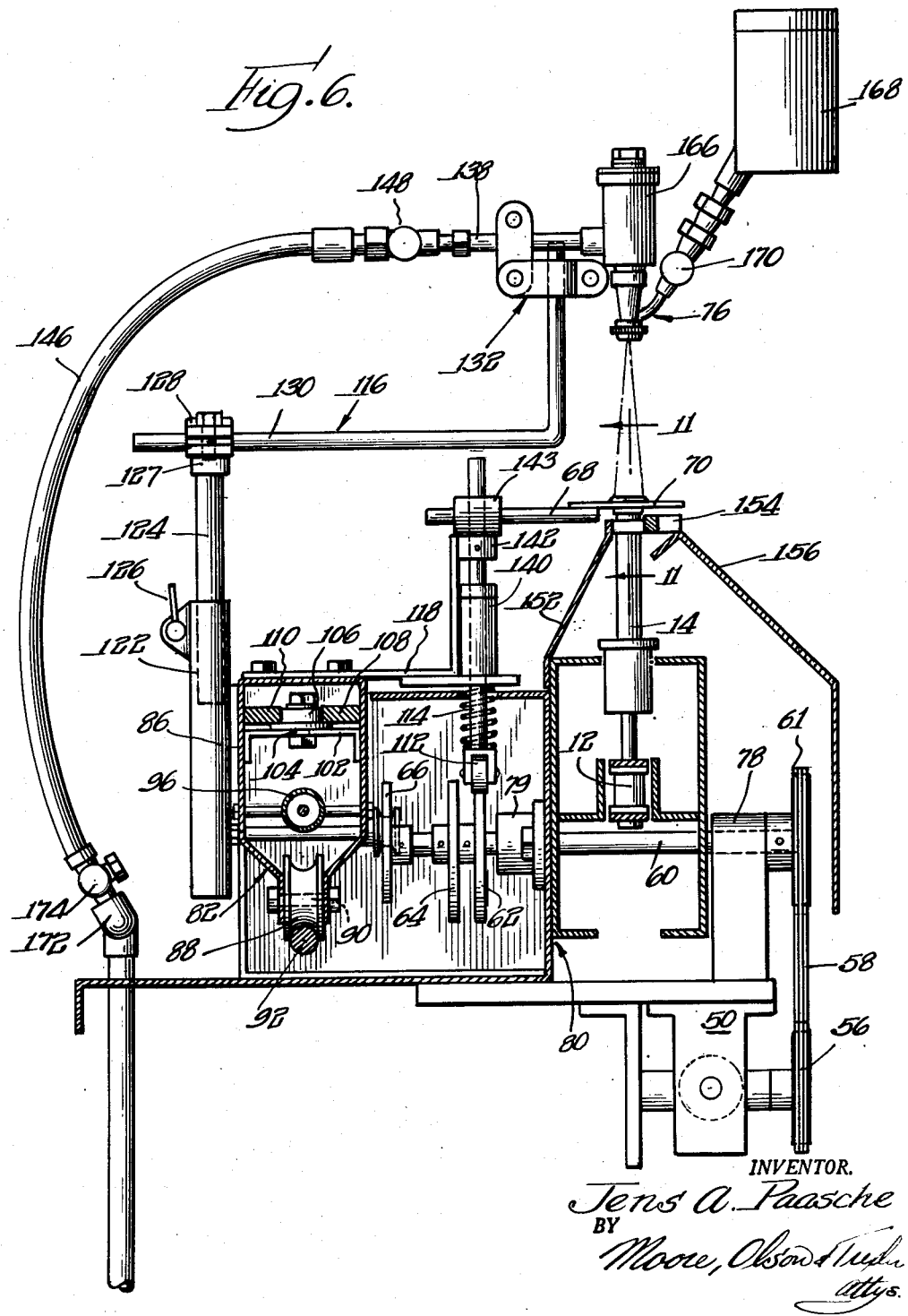
Figure 6 is a sectional view taken along the line 6—6 of Figure 1.

Referring more particularly to Figure 1 of the drawings, there is shown an automatic multi-color airpainting apparatus having a support or base 10 on which said apparatus is mounted, as shown in the drawings. A continuous conveyor chain 12 is mounted adjacent the top of the support 10 and adapted to be moved continuously around the support 10, as will be described subsequently. Article supports 13 are mounted on the conveyor chain 12 which comprise article support shafts 14 extending upwardly from the conveyor chain 12 with a cross blade support 15 at the upper end of the article support shafts. The cross blade supports 15 are adapted to hold the object to be coated by any suitable means, such as holes adapted to received a depending portion 17, as shown in Figure 12, on a typical object which might be coated with this device. A hood 16 is mounted over a portion of the conveyor chain 12; the hood is provided with a vent pipe 18 through which cleansed exhaust gases may be exhausted. The hood 16 is provided for the purpose of cleaning the paint-laden air before its exhaustion into the atmosphere. It is more specifically described in my co-pending application, Serial No. 545,812, now Patent No. 2,547,884, but may be generally described as follows: the hood 16 has an open front 17a and two side apertures 30 and 31 to permit the conveyor chain 12, with the article supports 13 and the objects carried thereon, to enter and leave the hood 16. The hood 16 extends forwardly of the support 10 and is provided with a shelf 27 on which the spraying unit, shown generally as 28, is mounted. A water tank 22 is located beneath the hood and is adapted to hold a supply of water. Water pipe 26 is mounted on and extends into the lower portion of the tank and is adapted to conduct water from the tank to a water pump 20 which is adapted to pump the water upwardly through pipe 24 which carries the water to spray nozzles, not shown, within the closed portion of the hood 16. In operation, as the paint-laden air is formed in the open front portion 17 of the hood 16, a fan, not shown, pulls the air into the spraying chamber of hood 16 where the paint and other particles are removed from the air by means of the continuous water spray. Paint and other impurities removed from the air are carried by the water through a drain pipe, not shown, back into the water tank where they collect and may be removed.

Motor 32, seen best in Figure 2, is provided for driving the conveyor belt 12 and the spraying unit, later to be described. The motor is mounted on support 10 and drives a speed reducer unit 39, also mounted on support 10, by means of a belt 40 which connects pulley wheel 34 with the motor 32 and pulley wheel 36 of the speed reducer 39. A shaft 41 extends upwardly from the speed reducer 39 and has a horizontally mounted sprocket wheel 38 affixed adjacent its end which is adapted to mesh with the links of the conveyor belt chain 12 to continuously drive the chain 12 in the desired direction. The pulley wheel 36, which drives the speed reducer 39, is supported in a bushing 45 provided by the housing of speed reducer 39. Supports 42 and 46 are provided to furnish additional support to the shaft 44. A second speed reducer 50 is mounted adjacent the other end of shaft 44 and a coupling means 48 is provided to accomplish the connection between shaft 44 and a shaft 52 which extends from the speed reducer 50. A shaft 54 extends at right angles from shaft 52 out of the speed reducer 50 and has positioned adjacent its end a sprocket wheel 56, shown in Figure 6. A chain 58 is positioned about a portion of the periphery of the sprocket wheel 56 and serves to drive a shaft 60 through a sprocket wheel 61 mounted thereon. Cam wheels 62, 64 and 66 are mounted on shaft 60, these wheels controlling the vertical movement of the bracket 68 upon which the stencil plates 70 are mounted, the opening and closing of valve 72, shown in Figure 8, which controls the supply of air used in operating the spray guns or airbrushes 76, and horizontal movement of the platform 74 of the carriage 82 upon which the brackets which support the airbrushes 76 and stencil plates 70 are mounted, respectively. It should be noted, as shown in Figure 6, that shaft 60 is supported at intervals, such means shown in the drawings as supports 78 and 79, the latter being mounted on the rear wall of housing 80.

Carriage 82, as best seen in Figure 3, is mounted on a support 84 which is itself supported on shelf 27. The support 84 is comprised of end walls 85 which are supported by shelf 27, a rod 92 secured at its end to the end wall 85, and two parallel tracks 108 and 110 mounted in a similar fashion adjacent the top of the end walls 85 and in substantially parallel relation to shelf 27. The carriage 82 is comprised of a housing 86 having self-oiling roller bearing wheels 88 and 89 mounted adjacent the bottom of the housing 86 on axles 90 and 91, these wheels being adapted to ride on rod 92 which acts as a track for wheels 88 and 89 as the carriage is moved back and forth over the same. The outer marginal surfaces of the wheels are preferably of a complementary shape to that of rod 92. Another axle 93 is passed through the housing 86 and has mounted adjacent one end, and exteriorly of the housing 86, a self-oiling bearing wheel 94 adapted to ride upon the cam wheel 66. A dash pot 96 is positioned within the carriage 82, having at its one end a bracket 98 attached to axle 93 of the housing 86 and at its other end a second bracket member 100 adapted to be pivotally secured to the end wall 85 of support 84 by means of a bracket 101 and a pin 103. The dash pot 96, shown in Figure 9, is comprised of a piston 158 slidably mounted in a housing 157 and operatively connected to bracket 98 by means of a connecting arm 159. A spring 160 is positioned intermediate the piston and the end wall of the housing 163 to urge the piston and connecting arm to the other end of the housing 157. The end wall 161 at this end of the housing 157 is provided with an orifice 162 through which the air exhausted by the piston must pass. A nozzle 164 is provided at the outer end of the orifice 162 so that the rate of air exhausted might be controlled. The dash pot 96 serves to urge wheel 94 continuously against cam wheel 66. Also mounted on carriage 82 is a bracket 102 which has depending flanges adapted to be attached to the opposite walls of the carriage 82. An aperture 104 is provided adjacent the middle of support 102 through which a bolt or the like may be mounted and on which a roller wheel 106 is rotatably mounted in a horizontal position. Wheel 106 is adapted to support the carriage in upright position by reason of its being positioned between the two tracks 108 and 110 of the support 84, as heretofore described.

The controlled movement of the carriage 82 during the operation of the device in the light of the above discussion is as follows: as shaft 60 is rotated, cam wheel 66 is likewise rotated and to wheel 94 is imparted a controlled horizontal movement relative to support 10 and shelf 27, which movement is similarly imparted to the carriage 82.

The operation of the control mechanism for synchronous operation of the stencil plates 70, the airbrushes 76 and the valves 72 for controlling the airbrushes 76 in conjunction with the movement of carriage 82 during the operation of this device is substantially as follows: as shaft 60 is driven by chain 58, the cam wheel 62 in the initial position holds a cam follower 112 which is rotatably mounted on the end of support rod 114 on which the supporting arm 68 and stencil plate 70 are positioned, in a plane above that of the object to be sprayed. At the same instant, cam wheel 64 is positioned substantially as shown in Figure 8 so that the lug 120 on its outer periphery is not in contact with the cam follower 121 on arm 119 so that no air is being released for spraying purposes. At this instant the carriage 82 is drawn by the dash pot 96 to a retracted position, as shown in Figure 3. As the shaft 60 continues to rotate, the airbrushes 76, which are mounted on support brackets 116, which in turn are affixed to the carriage 82, and the stencil plate 70 which is likewise affixed to the carriage by means of bracket 118, begin to move in synchronism with the conveyor chain which passes beneath them. Continued rotation of shaft 60 causes cam wheel 62 to be positioned substantially as shown in Figure 7 with the stencil plates 70 positioned immediately over and adjacent to the surfaces of the object 8 to be sprayed or painted. This is best seen in Figure 11. Cam wheel 64 operates valve 72 by depressing of arm 119 thus depressing valve stem 123. As the lug 120 of the cam wheel 64 contacts the end of the arm 119, compressed air is conducted during this contact period through airline 146 to the air brushes 76 for spraying the areas exposed by the apertures 69 provided in the stencil plates 70. The duration of the spraying period is determined by the length of lug 120 on cam wheel 64 and speed at which the wheel is driven. On further rotation of shaft 60, carriage 82 is withdrawn to the position indicated in Figure 3, this distance being equal to the distance between consecutive objects 8 to be painted, and the stencil plates 70 are simultaneously raised. The above discussion indicates the operation of the device for one revolution of shaft 60 and further rotation of shaft 60 would produce similar cycles.

The supporting means for the airbrushes or spray guns 76 is comprised of a socket member 122 affixed to the exterior wall 86 of the carriage 82. A rod 124 is adapted to be inserted within this bracket and may be clamped in any desired position by means of a thumb nut 126 which is adapted to draw together the bifurcated end 123 of the socket member 122. Adjacent the other end of rod 124 is positioned a cross support member 127 on which are mounted a plurality of U-shaped clamps 128 adapted to engage the end 130 of the bent rod support 116. Rod 116 is bent at suitable angles, as best shown in Figure 6, so as to support the airbrushes and accessories for same adjacent the end of rod 116 by means of a double clamp 132. Clamp 132, best seen in Figure 3, is a right angle clamp having two U-shaped clamp jaws 134 and 136 at opposite ends and adapted to clampingly engage rod 116 and airline 138, respectively. Such design permits the spray guns 76 to be positioned at any desired location, horizontally and vertically, relative to the work to be sprayed.

The supporting means for the stencil plates 70 comprises a bushing member 140 mounted on the supporting plate 118. Shaft 114 is slidably mounted on this bushing. A cross support 142 is fixedly mounted on shaft 114 and adapted to support a plurality of clamps to engage a plurality of supporting arms 68. A clamp 143 is positioned adjacent the end of rod 114, the clamp engaging supporting rod 68. This arrangement of parts permits the stencil plate 70 to be positioned horizontally and vertically for the work in that cross support 142 is adjustable on shaft 114 and rod 68 is extensible or retractible relative to clamp 143. In respect to the positioning of the stencil plates 70 and the corresponding airbrushes 76, it will be noted in Figure 4 that they have been positioned on every other object 8 passing beneath them. It should be understood that this was made for describing the arrangement of parts and to facilitate illustration of same. Furthermore, the stencil plate 70 might all be joined together and supported by one support arm 68 to accomplish the same result.

The airbrush 76, disclosed in Figure 6, is similar to that disclosed in previous patents of mine, but obviously could be of any brand on the market. The airbrush disclosed is comprised of a nozzle device 166 with a paint container 168 attached thereto. A valve 170 is provided to control the flow of paint into the head of the nozzle. Compressed air is conducted to the nozzle 166 through flexible tubing 146 and airline 138. A header 172 is provided between the valve 72 and the flexible tubing 146, having a plurality of connecting nipples 174 adapted to receive a plurality of tubes 146.

Mounted on the conveyor chain 12, as heretofore indicated, are a plurality of article supports 13. In order to assure the maintenance of these supports in an upright position, a spring urging member 152 and a guide bar 154 are provided along the conveyor belt in the vicinity of the spraying unit on opposed sides of the chain 12 so that the supports 13 are held in an upright predetermined position during the spraying operation. In addition, the spring member 152 serves to keep spray particles from the gun from falling onto the article supports 13 and conveyor chain 12. On the opposite side of the conveyor chain 12 is positioned a guard 156 which serves to shield the supports 13 and conveyor chain 12 from paint particles in a similar fashion to plate 152. The end of the guard 156 is positioned beneath guide bar 154 to insure a substantial seal.

The above description and the drawings referred to therein were used for the purposes of illustrating and describing a preferred embodiment of the present invention. However, applicant wishes it to be understood that he is not to be limited to the elements and their arrangement except as may be limited by the following claims.

I claim:

1. An automatic coating apparatus comprising a base, a conveyor element mounted on said base and provided with spaced-apart article supports, a carriage positioned adjacent said conveyor element, means to reciprocate said carriage in synchronism with said conveyor element, spraying means mounted on said carriage, stencil plates mounted on said carriage so as to be vertically reciprocable, and control means to synchronize the vertical movement of said stencil plates and the operation of said spraying means with the movement of said carriage in synchronism with said conveyor element.

2. A multi-color coating apparatus comprising a support, an endless conveyor mounted on said support, article supports mounted on said conveyor, a slidably mounted carriage positioned adjacent said conveyor, spray guns supported on said carriage, stencil plates supported on said carriage means to reciprocate said plates in a vertical direction, and control means to synchronize the horizontal movement of said carriage, the vertical movement of said stencil plates, and the operation of said spray guns with the movement of said conveyor.

3. An automatic aircoating apparatus comprising a base, a conveyor element mounted on said base and provided with spaced-apart article supports, a reciprocable carriage slidably mounted adjacent said conveyor element, means to reciprocate said carriage in timed relation with the movement of said article supports, a plurality of automatically operated airbrushes mounted on said carriage, a plurality of stencil plates slidably mounted on said carriage and adapted to be moved relative thereto, said stencil plates positioned between said airbrushes and said article supports, and control means to synchronize the movement of said stencil plates with the operation of said airbrushes and the movement of said carriage with the movement of said conveyor element.

4. A multi-color airpainting apparatus comprising a base, a conveyor means mounted on said base and provided with article supports, a reciprocable carriage mounted adjacent said conveyor means on said base, means to reciprocate said carriage, said means comprising a wheel rotatably mounted on said carriage, a cam wheel attached to a driving means, and spring urging means to retain said wheel and cam wheel in contacting relation, a plurality of airbrushes mounted on said carriage, a plurality of stencil plates slidably mounted on said carriage and positioned between said airbrushes and said article supports, and control means to synchronize the movement of said stencil plates with the movement of said carriage in synchronism with said conveyor chain and the operation of the airbrushes.

5. A multi-color airpainting apparatus comprising a base, a conveyor mounted on said base, article supports mounted on said conveyor, a movable carriage positioned adjacent said conveyor, means to reciprocate said carriage in timed relation with the movement of said article supports, a plurality of spray guns mounted on said carriage, a plurality of stencil plates slidably mounted on said carriage, means to reciprocate said stencil plates in a vertical direction, each of said stencil plates having an aperture therein, each aperture positioned to expose an area to be painted, and control means to synchronize the movement of said carriage with the movement of said stencil plates and the operation of said spray guns with the movement of said conveyor.

6. An automatic aircoating apparatus comprising a hood and an exhaust means connected thereto, a conveyor means arranged to pass through said hood, a plurality of article supports mounted on said conveyor means and adapted to support a plurality of objects to be sprayed, a movable support member, an airbrush mounted on said movable support member, means for moving said support member successively in one direction in synchronism with the movement of each succeeding article support, a plate mounted on said movable support member so as to be vertically reciprocable, means to vertically reciprocate said plate in synchronism with the movement of each succeeding article support, said plate having apertures therein for exposing predetermined areas of said objects, and means to render said airbrush effective to spray said objects when said plates are positioned adjacent said objects.

7. A multi-color airpainting apparatus comprising a hood and exhaust means connected thereto, a plurality of article supports arranged to pass through said hood and adapted to carry objects to be sprayed, means for moving said article supports through said hood, a plurality of spray guns mounted on a movable support member, a plurality of stencil plates movably mounted for vertical movement on said support member, each of said stencil plates provided with apertures exposing predetermined areas of the object to be sprayed, means for moving said support member in one direction periodically in synchronism with the movement of said article supports, means for positioning said stencil plates adjacent the objects to be sprayed, and means to render said spray guns effective to spray said objects when said stencil plates are positioned adjacent said objects.

8. An automatic airpainting apparatus comprising a hood and an exhaust means connected thereto, an endless conveyor element arranged to pass through said hood, a plurality of article supports mounted on said conveyor element and adapted to hold articles to be sprayed, an airbrush mounted on a movable support member, means for moving said support member successively in one direction in synchronism with the movement of each succeeding article support, and means comprising a cam wheel mounted on a driven shaft, a wheel mounted on said support member, and means to urge said wheel on said support member in continuous adjacent position relative to said cam wheel, a stencil plate slidably mounted for vertical movement on said movable support member, means adapted to vertically reciprocate said plate in synchronism with the movement of each succeeding article support, and means to render said airbrush effective to spray said articles successively.

9. An automatic coating apparatus comprising a base, a conveyor mounted on said base and provided with spaced apart article supports, stencil plates mounted adjacent said conveyor for movement therealong in synchronism therewith, means for reciprocating said stencil plates in a vertical direction whereby to place said stencil plates in operative position over certain article supports for a predetermined period of time, spraying means mounted adjacent said conveyor, means to move said spraying means in synchronism with said conveyor and in operative position relative to said stencil plates to spray articles on said article supports, and control means to synchronize the movement of said stencil plates and the operation of said spraying means with the movement of said conveyor.

10. An automatic coating apparatus comprising a base, conveyor means mounted on said base and having article support means carried thereby, carriage means positioned adjacent said conveyor means and movable relative thereto, spraying means and stencil means both mounted on said carriage means for movement therewith, means for moving said carriage means rearwardly of the direction of movement of the conveyor means and forwardly with the conveyor means and in synchronism therewith along a portion of the path of travel of the said conveyor means, control means operable to position said stencil means over the article supports during forward movement of the carriage means and conveyor means in synchronism and to shift said stencil means relative to the carriage means and away from said article supports after completion of the coating operation, and means controlling operation of said spraying means.

11. An automatic coating apparatus as claimed in claim 10, wherein the control means includes cam mechanism for positioning said stencil means over the article supports during forward movement of the carriage means and for shifting the same away from the article supports during rearward movement of the carriage means at the completion of the coating operation.

JENS A. PAASCHE.

REFERENCES CITED

The following references are of record in the file of this patent:

UNITED STATES PATENTS

| Number | Name | Date |
|---|---|---|
| 705,085 | Hormby | July 22, 1902 |
| 836,483 | Burdick | Nov. 20, 1906 |
| 1,188,648 | Hastings | June 27, 1916 |
| 2,373,604 | Schweitzer | Apr. 10, 1945 |